United States Patent
Bromenshenkel et al.

(10) Patent No.: US 11,208,021 B2
(45) Date of Patent: Dec. 28, 2021

(54) HAUL TRUCK DUMP BODY FRONT WALL SUPPORT

(71) Applicant: Caterpillar Inc., Peoria, IL (US)

(72) Inventors: Timothy J. Bromenshenkel, Tuscola, IL (US); Andres Munoz-Najar, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 243 days.

(21) Appl. No.: 16/663,825

(22) Filed: Oct. 25, 2019

(65) Prior Publication Data

US 2021/0122279 A1 Apr. 29, 2021

(51) Int. Cl.
*B60P 1/28* (2006.01)
*B62D 21/09* (2006.01)
*B62D 21/02* (2006.01)

(52) U.S. Cl.
CPC ............ *B60P 1/28* (2013.01); *B62D 21/02* (2013.01); *B62D 21/09* (2013.01)

(58) Field of Classification Search
CPC .. B60P 1/286; B60P 1/28; B60P 3/423; B60P 1/283; B60P 1/16; B60P 1/26; B60P 1/165; B60P 3/42; B60P 1/00; B60P 1/04; B60P 1/38; B62D 33/02; B62D 47/003; B62D 33/037; B62D 23/005; B62D 25/2054; B62D 33/0273; B62D 33/08; B62D 21/02; B62D 21/186
USPC .. 296/183.2, 183.1, 26.11, 186.4, 24.43, 66; 298/17 R, 22 R, 1 R, 18, 1 B, 1 H, 23 D, 298/23 DF, 23 R, 24
See application file for complete search history.

(56) References Cited

U.S. PATENT DOCUMENTS

| | | | |
|---|---|---|---|
| 6,076,693 A * | 6/2000 | Reiter | B60P 1/286 220/495.01 |
| 7,025,407 B2 | 4/2006 | Medel | |
| 8,820,844 B2 | 9/2014 | Moon et al. | |
| 9,108,558 B2 | 8/2015 | Hall | |
| 9,649,966 B2 | 5/2017 | Wang et al. | |
| 9,751,445 B1 | 9/2017 | Arul et al. | |
| 10,000,144 B2 | 6/2018 | Zamorano et al. | |
| 2002/0074848 A1* | 6/2002 | Azocar | B60P 1/286 298/24 |
| 2009/0108633 A1* | 4/2009 | Ohi | B62D 25/2036 296/204 |
| 2014/0015279 A1* | 1/2014 | De Paula e Silva | B62D 33/02 296/183.2 |
| 2014/0183904 A1 | 7/2014 | Moon et al. | |
| 2014/0232134 A1 | 8/2014 | Kitaguchi et al. | |
| 2015/0165957 A1 | 6/2015 | Sarangapani et al. | |

FOREIGN PATENT DOCUMENTS

EP          3495201          6/2019

* cited by examiner

*Primary Examiner* — D Glenn Dayoan
*Assistant Examiner* — Sunsurraye Westbrook
(74) *Attorney, Agent, or Firm* — Oblon, McClelland, Maier & Neustadt

(57) ABSTRACT

A support structure arrangement for a front wall of a dump body comprises a first vertical support structure and a second vertical support structure. The first and second vertical support structures can be elongate structural members spaced in a width direction from each other. Bottom portions of the first and second vertical support structures can form down-facing contact surfaces.

20 Claims, 5 Drawing Sheets

HAUL TRUCK DUMP BODY FRONT WALL SUPPORT

TECHNICAL FIELD

The present disclosure relates to haul trucks, and more particularly to dump body front wall support arrangements for haul trucks, and systems, components, and methods thereof.

BACKGROUND

Conventionally, rear haul trucks have a dump body pivotally connected to a haul truck frame adjacent to a rear end of the dump body. A problem can arise with regard to connection between the dump body and the haul truck frame. The connection between the dump body and the haul truck frame can provide for load support points. These load support points can be sensitive to constraints such as manufacturing variations, poor maintenance practices, and/or unreliable support definition. This can lead to added reinforcement of multiple load paths.

Additionally, rear haul trucks may be required to transport as much material as possible with the lightest possible machine weight, yet still meet service life expectations. Effective and efficient implementation of dump body support structures can reduce the weight of the dump body and hence the machine weight without reducing payload carrying capability.

U.S. Pat. No. 9,649,966 ("the '966 patent") describes a truck body for a machine having a bottom wall defining a front end and a rear end, a pair of lateral walls extending from the bottom wall, and a front wall extending between the pair of lateral walls at the front end. According to the '966 patent, a pair of bolster plates 136 are disposed adjacent to the front wall for supporting the front end of the truck body on the frame of the machine. The '966 patent further states that the pair of bolster plates 136 is supported vertically from the front beam, and a second intermediate beam is disposed adjacent to the front wall parallel to the front beam.

SUMMARY OF THE DISCLOSURE

In one aspect, a support structure arrangement is disclosed. The support structure arrangement can comprise a first vertical support structure having a bottom portion that forms a first down-facing contact surface; and a second vertical support structure having a bottom portion that forms a second down-facing contact surface. The first and second vertical support structures are hollow elongate structural members spaced in a width direction from each other, and each of the first and second down-facing contact surfaces is convex.

In another aspect, a support structure arrangement is disclosed. The support structure arrangement can be comprised of a first vertical support structure extending from a front face of a front wall of a dump body, the first vertical support structure having a bottom portion that forms a first down-facing contact surface; a second vertical support structure extending from the front face of the front wall, the second vertical support structure having a bottom portion that forms a second down-facing contact surface; and a horizontal support structure extending from the front face of the front wall, the horizontal support structure extending through the first and second vertical support structures. The first and second vertical support structures are elongate structural members spaced in a width direction of the dump body from each other.

And in yet another aspect, a dump body of an off-highway rear haul truck configured to be provided on a space frame of the off-highway rear haul truck is disclosed. The dump body can be comprised of a bottom wall; a pair of opposing sidewalls; and a front wall between the opposing sidewalls and extending from the bottom wall, a support structure arrangement being fixedly mounted on a front face of the front wall. The support structure arrangement can include a first vertical support structure extending from the front face of the front wall, the first vertical support structure having a first down-facing contact surface at a bottom portion thereof, and a second vertical support structure extending from the front face of the front wall, the second vertical support structure having a second down-facing contact surface at a bottom portion thereof. The first and second vertical support structures are elongate structural members spaced in a width direction of the dump body from each other such that the first and second vertical support structures are equally spaced from a vertical centerline of the dump body. Each of the first and second down-facing contact surfaces is convex.

Other features and aspects of this disclosure will be apparent from the following description and the accompanying drawings.

DETAILED DESCRIPTION

Figure 1:
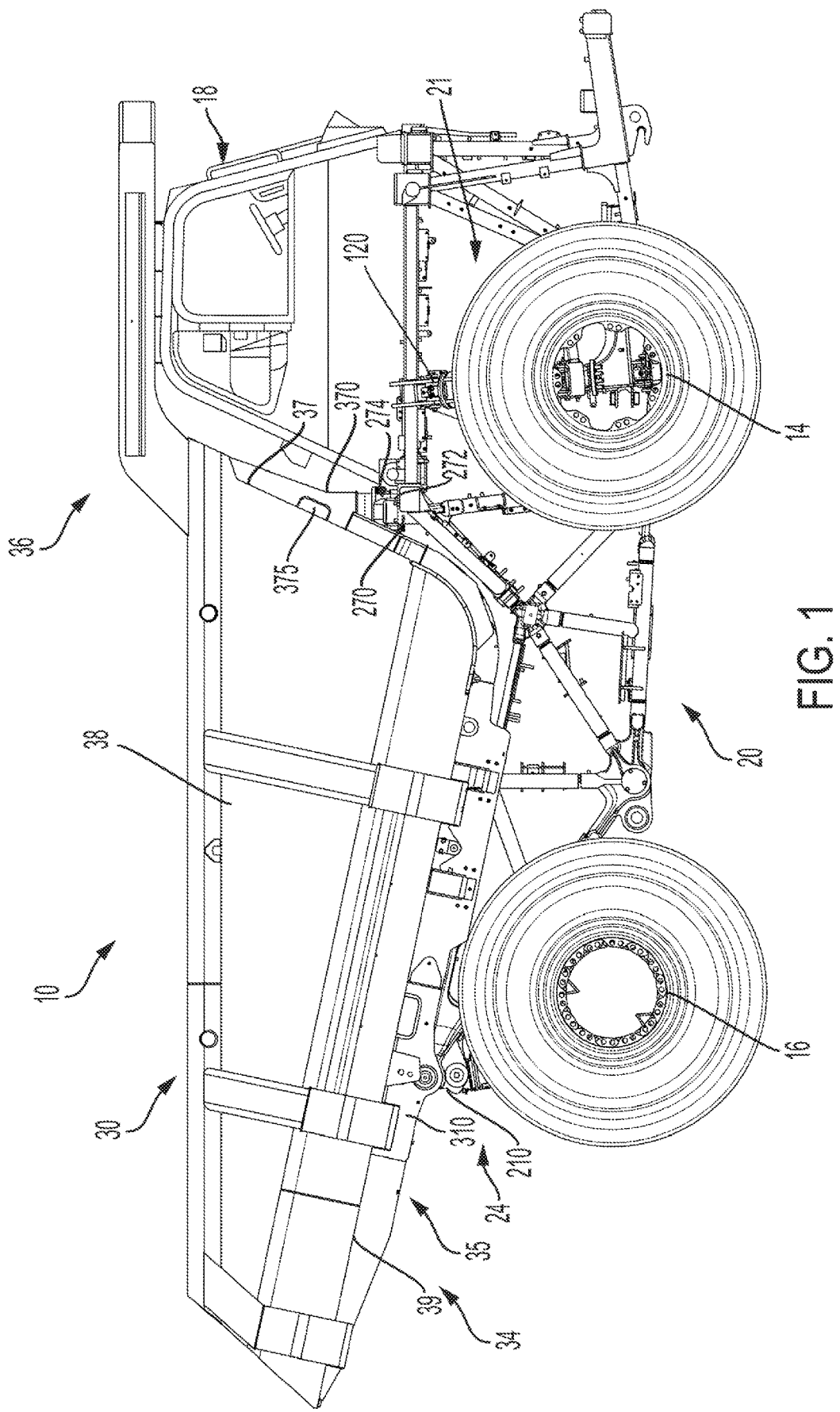
FIG. 1 is a side view of a machine according to embodiments of the disclosed subject matter.
Figure 2:
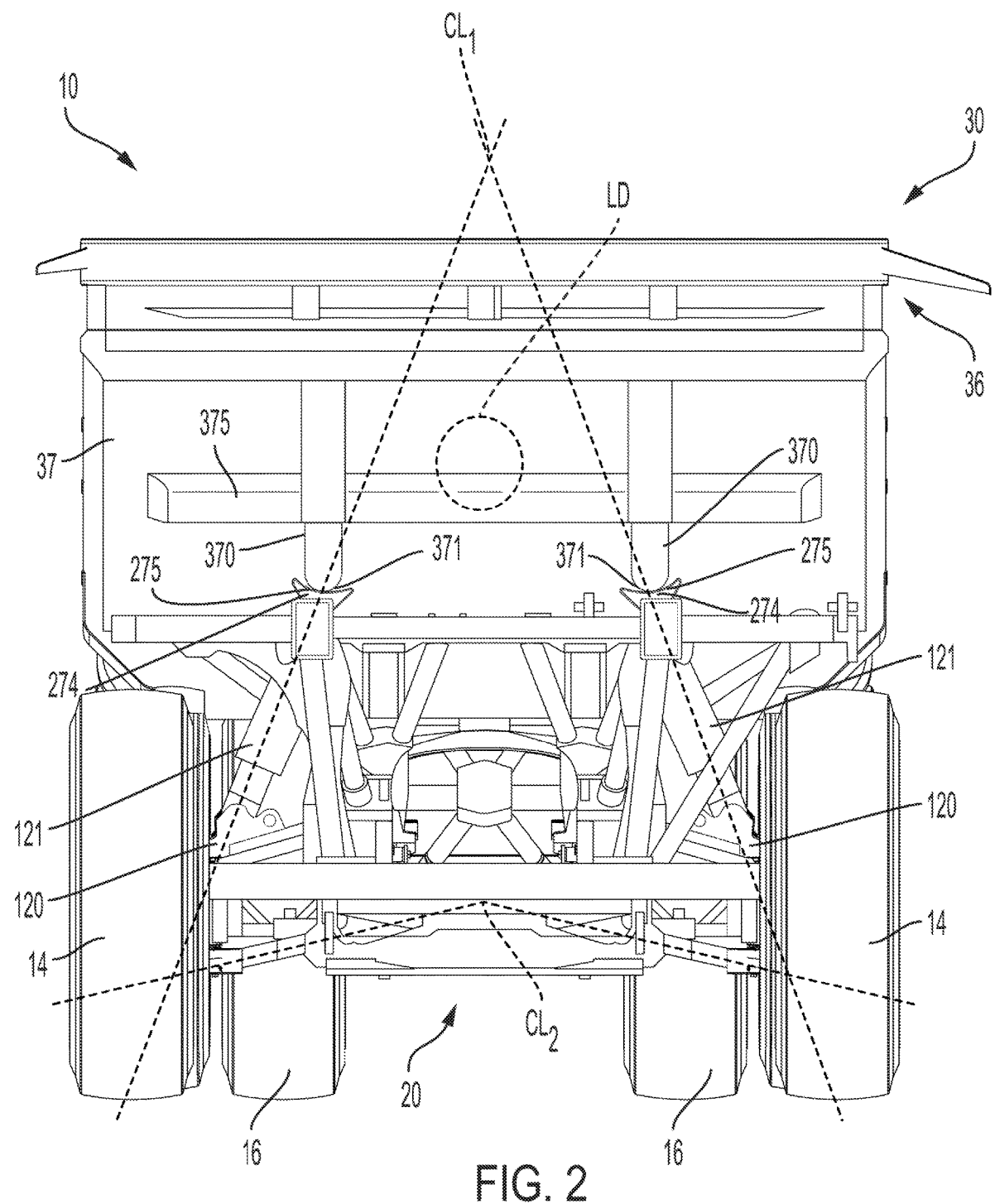
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30. Such heating configuration can be as set forth in U.S. application Ser. No. 16/663,692 filed Oct. 25, 2019 (Case 19-0765), which is incorporated herein by reference in its entirety.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance. For example, the space frame 20 can include a pair of rear frame connections 210 at the rear 24 of the space frame 20, a front upper frame connection 270, and a plurality of elongate support members. Elongate support members, according to embodiments of the disclosed subject matter, can be in the form of rods and/or tubes, circular, for instance, where some or all of the rods and/or tubes may be solid or hollow. The space frame 20 and corresponding connections can be as set forth in U.S. application Ser. No. 16/664,009 filed Oct. 25, 2019 (Case 19-0303), which is incorporated herein by reference in its entirety.

Referring to FIG. 1 and FIG. 2, the front upper frame connection 270, which may be a fabrication, can have a body with a pair of rocker attachment interfaces 272 on a top surface thereof. The rocker attachment interfaces 272 can be spaced from each other in a width direction of the space frame 20, for instance, provided at opposite outer lateral edges of the body of the front upper frame connection 270. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275 (see FIG. 2). The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30.

Figure 3:
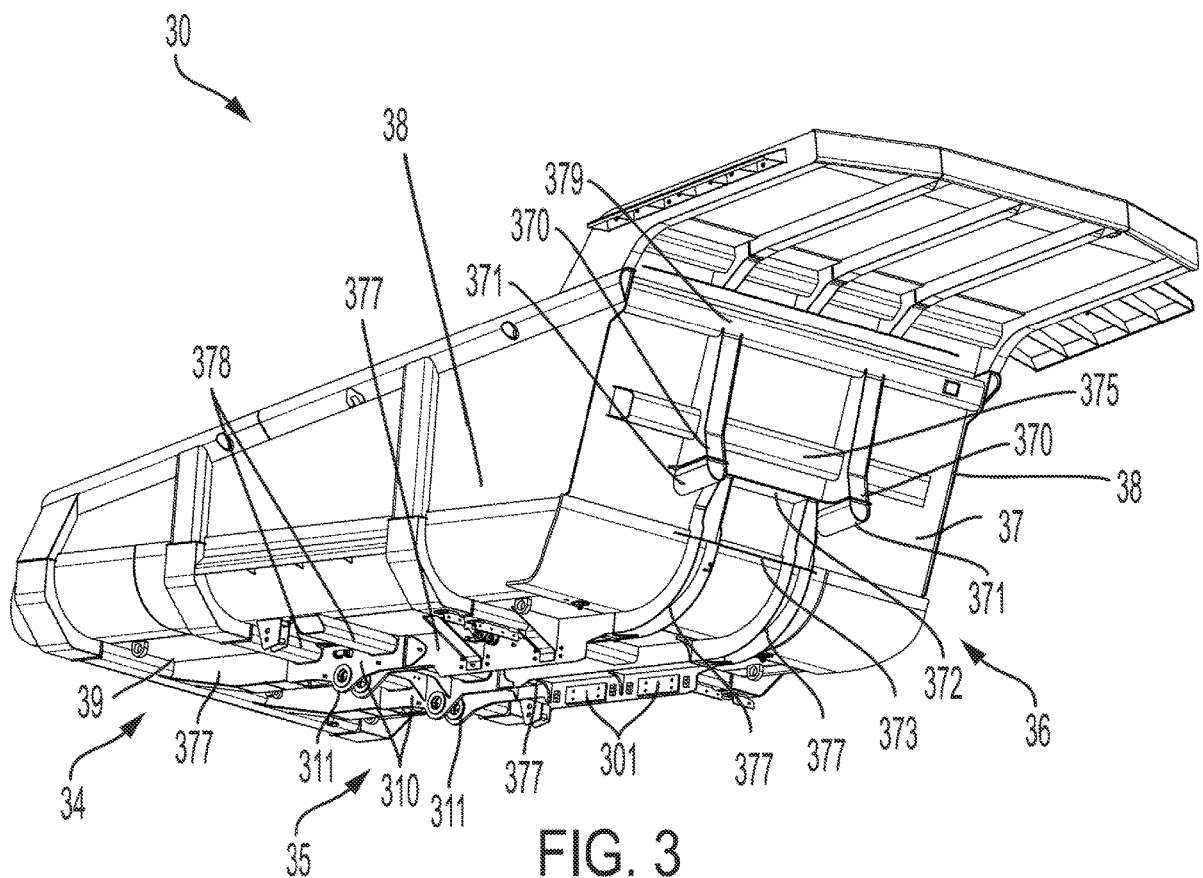
FIG. 3 is a front, side view of a dump body according to embodiments of the disclosed subject matter.
Figure 4:
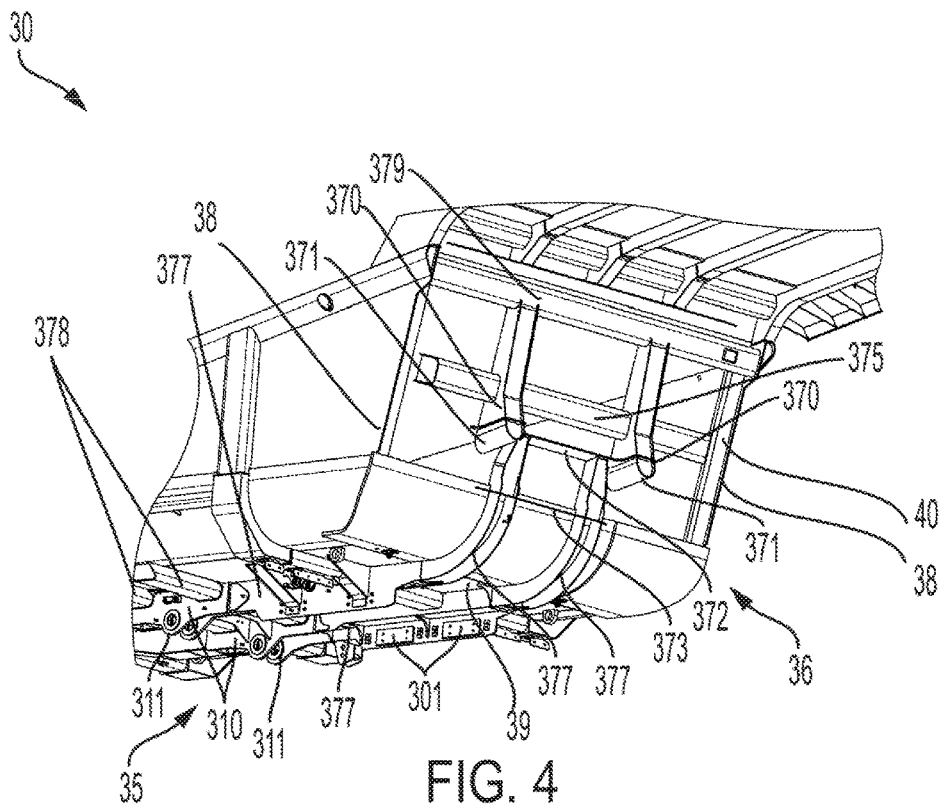
FIG. 4 is a front side view of a front portion of the dump body of FIG. 3 with a front wall of the dump body removed.

Turning now to FIG. 3 and FIG. 4, the dump body 30 can have, on the bottom 35 thereof, a rear pivot support 310 and a pair of flat contact surfaces 301, and on the front wall 37 thereof, a pair of the vertical support structures 370 of a support structure arrangement.

The rear pivot support 310 can be provided at the rear portion 34 of the dump body 30, such as shown in FIG. 1 and FIG. 3. The rear pivot support 310 can have a pair of rear pivots 311. The rear pivots 311 can be spaced apart from each other in a width or lateral direction of the dump body 30, such as shown in FIG. 3 and FIG. 4. The rear pivot support 310 can also include a cross-member, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 3 and FIG. 4, for instance, each rear pivot 311 can be welded in-line with the corresponding longitudinal body support member 377. Thus, the rear pivot 311 can be considered as part of the longitudinal body support member 377 (i.e., integral and/or one-piece with). Additionally, transverse body support members 378 can be received in cut-outs of the rear pivots 311.

The bottom 35 of the dump body 30 can include the plurality of flat contact surfaces 301, such as shown in FIG. 3 and FIG. 4. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof.

The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 3 and FIG. 4. Moreover, the flat contact surface 301 on one longitudinal support body member 377 can be spaced apart from the flat contact surface 301 on the opposing longitudinal support body member 377 in the width direction of the dump body 30. Hence, FIG. 3 and FIG. 4 show only one flat contact surface 301 (though this surface may include multiple flat contact surface portions as discussed below), the other being provided on the inward-facing surface of the near longitudinal support body member 377. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 3 and FIG. 4. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 3 may constitute the flat contact surface 301.

When the dump body 30 is in a lowered position (i.e., rest position), the flat contact surfaces 301 attached to the dump body 30 can be positioned adjacent to outer or lateral sides of outer elongate support members of the space frame 20 to account for horizontal or lateral loads.

A support structure arrangement can be fixedly mounted on the front face of the front wall 37 of the dump body 30, where the front wall 37 is between opposing sidewalls 38 of the dump body 30 and extends from one end of a bottom wall 39 at the bottom 35 of the dump body 30. The support structure arrangement can be comprised of a pair of vertical support structures 370 fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2.

Figure 5:
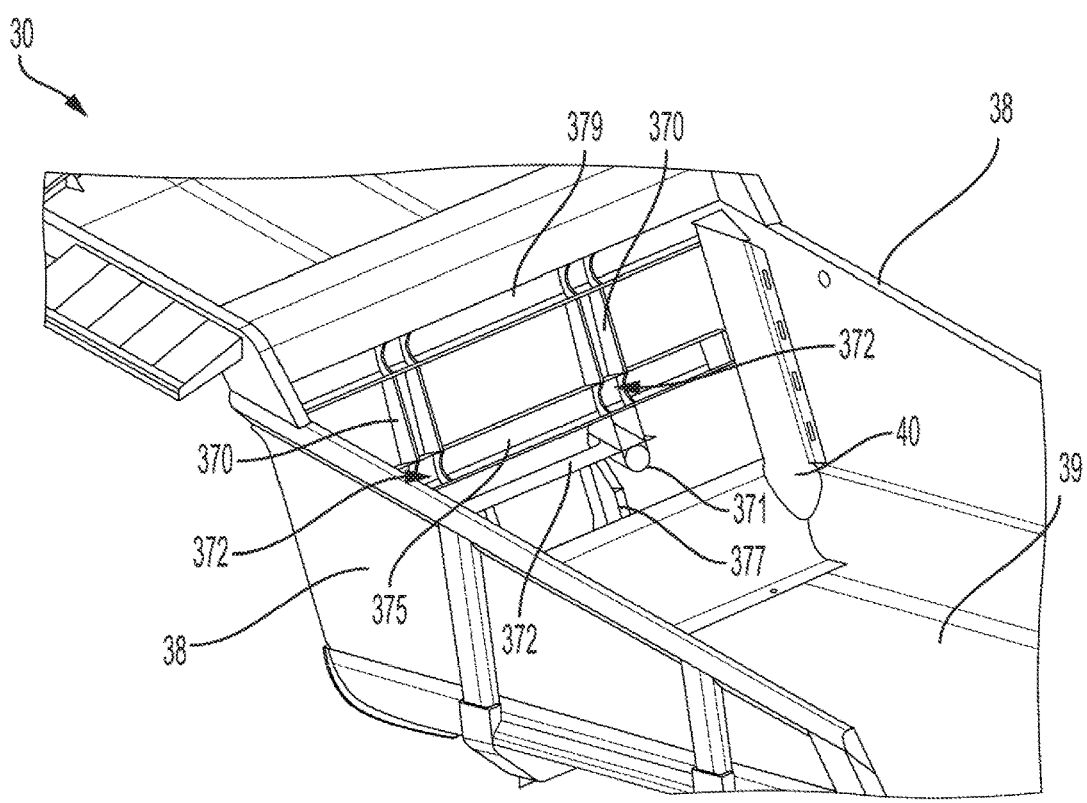
FIG. 5 is a top, rear perspective view of the front portion of the dump body of FIG. 3 with the front wall of the dump body removed.

Optionally, as shown in FIG. 5, the vertical support structures 370 can be hollow elongate support members. According to one or more embodiments, each of the vertical support structures 370 can be formed of shaped sheet metal, for instance, different pieces of shaped sheet metal. Thus, according to one or more embodiments, the vertical support structures 370 may be comprised of a plurality of vertical support structure sections. Optionally, a loading plate 372 may be provided between portions of the vertical support structures 370, for instance, for manufacturing purposes (i.e., placement of the bottom portions of the vertical support structures 370 forming the down-facing contact surfaces 371).

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 20 degrees or less from vertical.

According to one or more embodiments, the support structure arrangement can also include a horizontal support structure 375, which can also be fixed (e.g., welded) to the front face of the front wall 37. The horizontal support structure 375 can extend through the vertical support structures 370. For example, the horizontal support structure 375 can extend through the vertical support structures 370 such that a first portion of the horizontal support structure 375 is between the vertical support structures 370, a second portion of the horizontal support structure 375 is between one of the vertical support structures 370 and one of the sidewalls 38, and a third portion of the horizontal support structure 375 is between the other vertical support structure 370 and the other of the sidewalls 38.

Opposite ends of the horizontal support structure 375 can be offset inward from the correspondence sidewalls 38. That is, the opposite ends of the horizontal support structure 375 may not touch the sidewalls 38. Intersecting surfaces of the horizontal support structure 375 and each vertical support structure 370 can be fixedly attached via welding, for instance. Optionally, as shown in FIG. 5, the horizontal support structure 375 can be a hollow elongate support member. According to one or more embodiments, the horizontal support structure 375 can be formed of shaped sheet metal.

The vertical support structure 370 can be thicker (i.e., extend more from the front wall 37) than the horizontal support structure 375. For example, the vertical support structure 370 can be thicker than the horizontal support structure 375 at least where the horizontal support structure 375 intersects the vertical support structures 370. Additionally, the vertical support structures 370 may be thicker (i.e., extend more from the front wall 37) at a bottom portion as compared to a top portion. That is, the vertical support structure 370 can taper from thick to thin from the bottom portion to the top portion, which may, according to one or more embodiments, reach a top transverse body support member 379.

The bottom portions of the vertical support structures 370 can form down-facing contact surfaces 371. According to one or more embodiments, the down-facing contact surface 371 can be convex, for instance, semi-cylindrical, such as shown in FIGS. 2-4 and 6, or elliptical or multi-planar. The down-facing contact surfaces 371 of the vertical support structures 370 can be the same configuration. The down-facing contact surfaces 371 can be configured to be received or seated in the upward-facing contact surfaces 275 of the support rockers 274. Unlike the support rockers 274, the vertical support structures 370, themselves, do not pivot.

Figure 6:
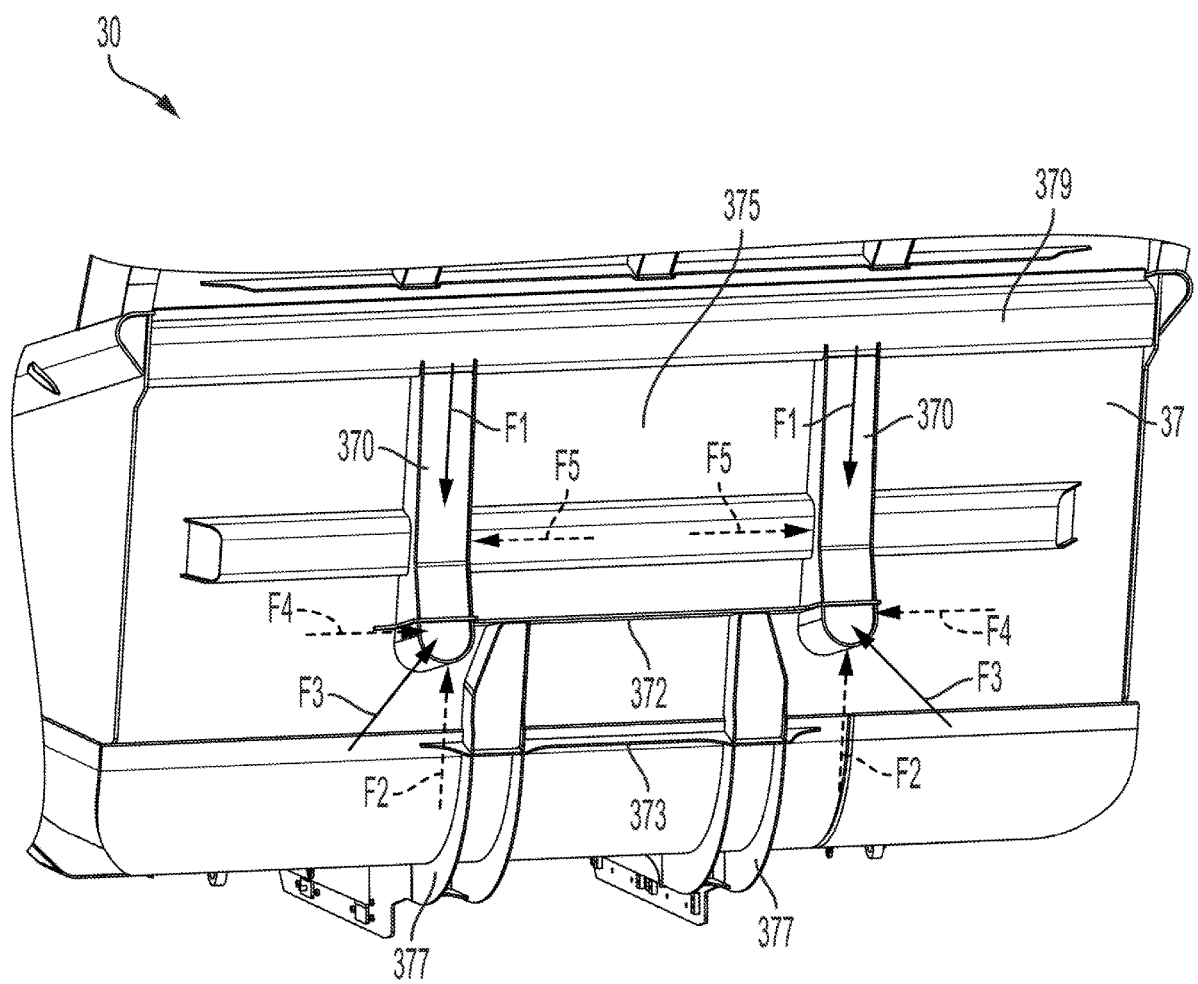
FIG. 6 shows a front wall of the dump body according to embodiments of the disclosed subject matter.

According to one or more embodiments, one or more longitudinal body support members 377 can extend from the bottom wall 39 to the front wall 37 (i.e., transition from horizontal to vertical). As shown in FIG. 6, for instance, two longitudinal body support members 377 can extend along the front wall 37 such that ends thereof are provided between the vertical support structures 370. Optionally, a loading plate 373 may be provided between portions of the vertical support structures 370, for instance, for manufacturing purposes.

Referring to FIG. 5, an inner support 40 may be provided at corners between the sidewalls 38 and the front wall 37. Generally speaking, the inner supports 40 can provide protective interfaces between the sidewalls 38 and the front 37 to transfer stresses from an actual interface between the sidewalls 38 and the front wall 37. The inner supports 40 can also prevent the corners at the interface between the sidewalls 38 and the front wall 37 from being relatively sharp, which may otherwise allow hauling material in the dump body 30 to coalesce at the relatively sharp corners.

INDUSTRIAL APPLICABILITY

As noted above, embodiments of the present disclosure relate to dump body front wall support arrangements for haul trucks, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by lift cylinders.

A first pair of contact points can be provided by the rear frame connection 210 of the space frame 20 and the rear pivots 311 of the rear pivot supports 310 of the dump body 30. The rear frame connection 210 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear frame connection 210 and the rear pivots 311.

A second pair of contact points can be provided by the positioning of the flat contact surfaces 301 relative to outer elongate support members. In particular, the flat contact surfaces 301, which notably can be on or part of the dump body 30 and not the space frame 20, can be provided adjacent to outer or lateral sides of outer elongate support members of the space frame 20. Additionally, according to one or more embodiments of the disclosed subject matter, the flat contact surfaces 301 can contact the outer elongate support members. Such positioning of the flat contact surfaces 301 can be when the dump body 30 is in the lower-most or rest position. Moreover, such positioning of the flat contact surfaces 301 can accommodate for lateral or horizontal forces from the corresponding outer elongate support members of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

Support structure arrangements on the front wall 37 of the dump body 30 according to embodiments of the disclosed subject matter can transfer loading through the space frame 20 to the front suspension system and the front wheels 14. In particular, the vertical support structures 370, particularly the down-facing contact surfaces 371 when contacting the upward-facing contact surfaces 275 of the support rockers 274, can transfer loading through the space frame 20 to the front suspension system and the front wheels 14. Indeed, as an example, all of the vertical loading (e.g., F1, F2, and vertical component of F3 of FIG. 6) can go through or be shared by the pivot pins of the rocker attachment interfaces 272 and the support rockers 274 by way of the vertical support structures 370, particularly the down-facing contact surfaces 371. To some extent, support for horizontal components of force vectors (e.g., F4, F5, and horizontal component of F3 of FIG. 6) with respect to the dump body 30 load being transferred through the space frame 20 and the front suspension system to the front wheels 14 can be controlled based on the incline or offset of the pivot axis of the support rocker 274 relative to the vertical centerline of the vertical support structure 370. However, support structure arrangements on the front wall 37 of the dump body 30 according to embodiments of the disclosed subject matter can also provide support for the horizontal components of force vectors.

Additionally, because the support rockers 274 can pivot laterally and independently of each other, and because both the support rockers 274 and the vertical support structures 370 can have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 271/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A dump body of an off-highway rear haul truck configured to be provided on a space frame of the off-highway rear haul truck, the dump body comprising:
    a bottom wall;
    a pair of opposing sidewalls; and
    a front wall between the opposing sidewalls and extending from the bottom wall, a support structure arrangement being fixedly mounted on a front face of the front wall,
    wherein the support structure arrangement includes:
    a first vertical support structure extending from the front face of the front wall, the first vertical support structure having a first down-facing contact surface at a bottom portion thereof, and
    a second vertical support structure extending from the front face of the front wall, the second vertical support structure having a second down-facing contact surface at a bottom portion thereof,
    wherein the first and second vertical support structures are elongate structural members spaced in a width direction of the dump body from each other such that the first and second vertical support structures are equally spaced from a vertical centerline of the dump body, and
    wherein each of the first and second down-facing contact surfaces is convex.

2. The dump body of claim 1, wherein the first and second down-facing contact surfaces are one of semi-cylindrical, elliptical, or multi-planar.

3. The dump body of claim 1,
    wherein the support structure arrangement further includes a horizontal support structure extending from the front face of the front wall,
    wherein the horizontal support structure extends through the first and second vertical support structures such that a first portion of the horizontal support structure is between the first and second vertical support structures, a second portion of the horizontal support structure is between the first vertical support structure and a first one of the sidewalls, and a third portion of the horizontal support structure is between the second vertical support structure and a second one of the sidewalls, and
    wherein outer ends of the second and third portions of the horizontal support structure are offset inward of and do not touch the respective sidewalls.

4. The dump body of claim 3, wherein intersecting surfaces of the horizontal support structure and the first and second vertical support structures are welded together.

5. The dump body of claim 3, wherein the horizontal support structure is hollow.

6. The dump body of claim 3, wherein the first and second vertical support structures are thicker than the horizontal support structure at least at where the horizontal support structure intersects the first and second vertical support structures.

7. The dump body of claim 1, wherein the first and second down-facing contact surfaces are configured to be seated on upward-facing contact surfaces of respective support rockers pivotally attached to the space frame.

8. The dump body of claim 1, wherein the first and second vertical support structures are hollow.

9. The dump body of claim 1, wherein each of the first and second vertical support structures are thicker at the bottom portion in a side view of the support structure arrangement.

10. The dump body of claim 1, further comprising first and second longitudinal body support members extending in a length direction of the dump body from the bottom wall to the front wall, between the first and second vertical support structures.

11. A support structure arrangement comprising:
    a first vertical support structure extending from a front face of a front wall of a dump body, the first vertical support structure having a bottom portion that forms a first down-facing contact surface;
    a second vertical support structure extending from the front face of the front wall, the second vertical support structure having a bottom portion that forms a second down-facing contact surface; and
    a horizontal support structure extending from the front face of the front wall, the horizontal support structure extending through the first and second vertical support structures,
    wherein the first and second vertical support structures are elongate structural members spaced in a width direction of the dump body from each other.

12. The support structure arrangement of claim 11, wherein each of the first and second down-facing contact surfaces is convex.

13. The support structure arrangement of claim 12, wherein the first and second down-facing contact surfaces are one of semi-cylindrical, elliptical, or multi-planar.

14. The support structure arrangement of claim 11, wherein the horizontal support structure extends from both sides of each of the first and second vertical support structures.

15. The support structure arrangement of claim 11, wherein intersecting surfaces of the horizontal support structure and the first and second vertical support structures are welded together.

16. The support structure arrangement of claim 11,
    wherein the first and second vertical support structures and the horizontal support structure are hollow, and wherein the first and second vertical support structures are thicker than the horizontal support structure at least at where the horizontal support structure intersects the first and second vertical support structures.

17. The support structure arrangement of claim 11, wherein each of the first and second vertical support structures are thicker at the bottom portion in a side view of the support structure arrangement.

18. A support structure arrangement comprising:
a first vertical support structure having a bottom portion that forms a first down-facing contact surface; and
a second vertical support structure having a bottom portion that forms a second down-facing contact surface,
wherein the first and second vertical support structures are hollow elongate structural members spaced in a width direction from each other, and
wherein each of the first and second down-facing contact surfaces is convex.

19. The support structure arrangement of claim 18, further comprising a horizontal support structure extending through the first and second vertical support structures, the horizontal support structure being a hollow elongate structural member.

20. The support structure arrangement of claim 19,
wherein the horizontal support structure extends from both sides of each of the first and second vertical support structures, and
wherein intersecting surfaces of the horizontal support structure and the first and second vertical support structures are welded together.

* * * * *